United States Patent [19]

Arena et al.

[11] Patent Number: 5,420,183

[45] Date of Patent: May 30, 1995

[54] FLAME RETARDANT POLYPROPYLENE COMPOSITION

[75] Inventors: Arthur A. Arena, Trenton, N.J.; Parvin Sawhney, Bloomsburg, Pa.

[73] Assignee: HPG International, Inc., Somerset, N.J.

[21] Appl. No.: 88,513

[22] Filed: Jul. 6, 1993

[51] Int. Cl.$^6$ ............................................. C08K 5/527
[52] U.S. Cl. ........................... 524/120; 524/373; 524/410; 524/411; 524/413; 524/423
[58] Field of Search .............. 524/410, 411, 413, 423, 524/120, 373

[56] References Cited

U.S. PATENT DOCUMENTS

| | | | |
|---|---|---|---|
| 3,198,596 | 8/1965 | Green | 524/433 |
| 3,687,890 | 8/1972 | Susuki et al. | 260/41 R |
| 3,803,067 | 4/1974 | Kehr et al. | 260/28.5 R |
| 3,883,481 | 5/1975 | Kopetz et al. | 524/373 |
| 3,892,815 | 7/1975 | Schmerling | 524/467 |
| 3,933,731 | 1/1976 | Machi et al. | 260/40 R |
| 3,953,565 | 4/1976 | Mizutani et al. | 524/433 |
| 3,976,612 | 8/1976 | Kaji et al. | 524/423 |
| 3,981,840 | 9/1976 | Yamamoto et al. | 524/423 |
| 4,005,156 | 1/1977 | Schmerling | 524/467 |
| 4,029,512 | 6/1977 | Jaunarajs et al. | 524/423 |
| 4,038,237 | 7/1977 | Snyder | 524/423 |
| 4,124,562 | 11/1978 | Yui et al. | 524/423 |
| 4,126,593 | 11/1978 | Takahashi | 524/436 |
| 4,248,747 | 2/1981 | Washecheck et al. | 524/423 |
| 4,379,190 | 4/1983 | Schenck | 524/423 |
| 4,407,992 | 10/1983 | Keogh | 524/436 |
| 4,480,065 | 10/1984 | Kawai et al. | 524/433 |
| 4,550,130 | 10/1985 | Kishida et al. | 524/433 |
| 4,686,257 | 8/1987 | Mitsuno et al. | 524/423 |
| 4,734,450 | 3/1988 | Kawai et al. | 524/436 |
| 4,803,231 | 2/1989 | Seinera et al. | 524/423 |
| 4,866,177 | 9/1989 | Egashira et al. | 524/406 |
| 4,921,916 | 5/1990 | Howell et al. | 524/436 |
| 4,962,148 | 10/1990 | Orikasa et al. | 524/436 |
| 4,963,605 | 10/1990 | Fukui et al. | 524/436 |
| 4,987,173 | 1/1991 | Nomura et al. | 524/436 |
| 5,124,404 | 6/1992 | Atwell et al. | 525/72 |
| 5,130,357 | 7/1992 | Akitaya et al. | 524/100 |
| 5,216,059 | 6/1993 | Atwell et al. | 524/376 |

FOREIGN PATENT DOCUMENTS

0462722A2 12/1991 European Pat. Off. .
633568 12/1982 Switzerland .

OTHER PUBLICATIONS

Raymond B. Seymour–Additives for Plastics, vol. 1, 233–248 (1978).
L. Mascia—The Role of Additives in Plastics, 127 (1974).
Patent Abstracts of Japan, vol. 14, No. 086 Abstract of JP-A-01 299 849 published Dec. 4, 1989.

*Primary Examiner*—Veronica P. Hoke
*Attorney, Agent, or Firm*—Richard S. Roberts

[57] ABSTRACT

The invention provides a substantially uniformly blended, flame retardant polypropylene composition and an extruded polypropylene sheet which comprises a polypropylene polymer, the bis(2,3-dibromopropylether) of tetrabromobisphenol A, antimony trioxide, titanium dioxide, calcium sulfate and distearyl pentaerythritol diphosphite. The invention further provides a method for producing such a polypropylene sheet material by forming a substantially uniform physical blend of the above components; drying the blend; heating the blend at a temperature above its melting point to form a melt of the blend components while mixing the melt; and extruding the blend through a sheet forming die and highly polished rollers.

22 Claims, No Drawings

FLAME RETARDANT POLYPROPYLENE COMPOSITION

BACKGROUND OF THE INVENTION

The present invention relates to a flame retardant polymer compositions and more particularly to flame retardant polypropylene compositions. Such compositions are suitable for manufacturing extruded sheets useful for construction and building materials.

Polypropylene resin is widely used in the production of etching tanks, electroplating tanks, hot air ducts, computer cabinets, electrical appliances, household interior decorations, and automobile parts among many other items. It is a polymer of choice due to its good processing characteristics, chemical resistance, weathering resistance, electrical properties and mechanical strength. One major disadvantage is that polypropylene is naturally flammable. This has generated a growing demand for flame retardant type of polypropylene and many such flame retardant polypropylene compositions have been suggested in the art. For example, it is known in the art to impart flame resistance to polypropylene compositions by the inclusion of certain fillers in a molten blend of the polymer. In this regard, U.S. Pat. No. 5,130,357 forms a blend of polypropylene, a synthetic rubber, silane coupling agent, ammonium polyphosphite, and a nitrogen containing organic compound. U.S. Pat. Nos. 3,892,815 and 4,005,156 uses poly (polyhalonorbornenylalkyl) benzene blended with polypropylene. U.S. Pat. No. 5,124,404 mixes polypropylene with a copolymer of polypropylene and a brominated styrene monomer. U.S. Pat. No. 5,216,059 discloses a flame retarding additive composition, useful in thermoplastic polyolefins comprising a mixture of a halogenated bisphenol derivative and the copolymer of a halogenated vinyl aromatic grafted onto polyolefin. The preferred bisphenol derivative is tetrabromobisphenol A bis(dibromopropyl ether), and the preferred graft copolymer comprises bromostyrene grafted onto isotactic or syndiotactic polypropylene. U.S. Pat. No. 3,687,890 teaches a thermoplastic composition which may include polypropylene, calcium sulfite, calcium sulfate and calcium carbonate. Calcium sulfate fillers are also taught in U.S. Pat. Nos. 3,198,596; 3,033,731; 3,953,565; 3,976,612; and 3,981,840, among many others. Antimony trioxide as a flame retardant is taught in U.S. Pat. No. 4,962,148. U.S. Pat. No. 4,038,237 teaches a composition of an alpha olefin, antimony trioxide and calcium sulfate in the presence of an extending oil, chlorinated hydrocarbon and a block copolymer of an elastomer and a non-elastomer. U.S. Pat. No. 3,803,067 imparts fire retardant properties to polypropylene with antimony trioxide, calcium sulfate and chloroparaffins, among other fillers.

It is most desirable to form a polypropylene composition which can be used for the formation of very smooth, lightweight sheets which have a sufficient degree of flame retardancy to meet the requirements of construction grade materials. In this regard, the flame retardant polypropylene compositions of the prior art suffer from a number of disadvantages. In order to satisfy the flame retardancy requirements for commercial use, the material must pass the Underwriters Laboratory Test Subject 94 which is described hereinafter. The materials described above either are incapable of meeting this requirement or, in order to meet the test specification must use an inordinate amount of filler with the result that sheets formed from the material are unacceptably dense. In addition, the large amount of filler produces a sheet material which is insufficiently smooth and at best require an additional, expensive, pressing step after sheet extrusion in order to produce a smooth sheet.

The present invention provides a composition which meets these requirements. That is, a polypropylene composition is provided which is capable of forming extruded sheets which meet the UL 94 flame retardancy test specification and is a low density material having a specific gravity of less than 1.1, preferably less than 1.0. It furthermore exits from a sheet forming extruder with a very smooth surface which does not need to undergo an additional pressing surface step to attain such a smooth surface. The polypropylene product of the present invention is advantageous since it has a lower cost and lower density than known flame retardant polypropylene materials while retaining its usefulness for the production of such items as tanks, ducts, cabinets, appliances, automobile parts and the like. In addition, the composition of this invention does not produce irritating fumes during manufacture.

SUMMARY OF THE INVENTION

The invention provides a substantially uniformly blended, flame retardant polypropylene composition which comprises:
  a) a polypropylene polymer in an amount sufficient to form a substantially uniform composition when blended with the other composition components; and
  b) from about 8% to about 16% by weight of the polypropylene of the bis(2,3 dibromopropylether) of tetrabromobisphenol A); and
  c) from about 1.5% to about 6.5% by weight of the polypropylene of antimony trioxide; and
  d) from about 2% to about 7% by weight of the polypropylene of titanium dioxide; and
  e) from about 7% to about 17% by weight of the polypropylene of calcium sulfate; and
  f) from 0.05% to about 0.40% by weight of the polypropylene of distearyl pentaerythritol diphosphite.

The invention also comprises an extruded polypropylene sheet material which comprises the above composition.

The invention further comprises a method for producing a polypropylene sheet material which comprises i.) forming a substantially uniform physical blend comprising the above components; ii.) optionally drying the blend; iii.) heating the blend at a temperature above its melting point to thereby form a melt of the blend components while mixing the melt; and iv.) extruding the blend through a sheet forming die and highly polished rollers.

DETAILED DESCRIPTION OF THE PREFERRED EMBODIMENT

In the practice of the present invention, a composition is prepared which is broadly composed of a mixture of the above compounds. A polypropylene series resin of essentially any grade can be selected according to the desired performance requirements such as formability and mechanical properties, including stiffness, heat resistance, and the like of the resulting composition. The polypropylene component is preferably a polypropylene homopolymer in pellet form having a melting point in the range of from about 325 to about 335. It preferably has a specific gravity in the range of from about 0.88 to about 0.91 and most preferably about 0.90. The polypropylene grade of choice has a melt flow rate in the range of from about 0.2 to about 30 g/10 min. and more preferably from about 1 to about 5 g/10 min. The most preferred polypropylene is grade 5B82H commercially available from Huntsman Polypropylene Corporation of Woodbury, New Jersey. The amount of polypropylene is at least that amount sufficient to extrude a substantially uniform sheet when blended with the other composition components. It is preferably present in an amount of at least about 70% by weight of the overall composition.

The composition then contains a halogenated bisphenol derivative component which is the bis (2,3-dibromopropylether) of tetrabromobisphenol A) and has the empirical formula $C_{21}H_{20}Br_8O_2$. This component is preferably present in the overall composition in an amount of from about 8% to about 16%, more preferably from about 10% to about 12% based on the weight of the polypropylene in the overall composition. The most preferred component is available commercially as PE-68 from Great Lakes Chemical Corporation of West Lafayette, Ind.

The composition further contains antimony trioxide. It is preferably present in an amount of from about 1.5% to about 6.5%, more preferably from about 2% to about 5% based on the weight of the polypropylene in the overall composition. This component is available commercially as Microfine AO3 from Anzon, Inc. of Philadelphia, Pa.

The composition contains titanium dioxide in an amount of from about 2% to about 7% or more preferably from about 2% to about 5% based on the weight of the polypropylene in the overall composition. This component is available commercially as NL 2073 from Kronos, Inc. of Houston, Tex.

The composition then contains calcium sulfate in an amount of from about 7% to about 17% or more preferably from about 10% to about 14% based on the weight of the polypropylene in the overall composition. This component is available commercially as 164 calcium sulfate (anhydrous) NF from Lenape Chemicals, Inc. of Bound Brook, N.J.

The composition contains distearyl pentaerythritol diphosphite which has the empirical formula $C_{41}H_{82}O_6P_2$. It is preferably present in an amount of from about 0.05% to about 0.40% or more preferably from about 0.10% to about 0.25% based on the weight of the polypropylene in the overall composition. This component is available commercially as Doverphos S680 from Dover Chemical Corporation of Dover, Ohio.

All of the above non-polypropylene components can have a mean particle size selected arbitrarily depending on the required performance and is, in general up to about 20 microns and preferably up to about 5 microns.

In the method of the invention, the polypropylene and other components are blended in the desired quantities and heated to a temperature above the melting point of the polypropylene. The heating and blending can be done in either order, however, in the preferred embodiment, these processes are conducted simultaneously. The mixing may be conducted in any suitable equipment including a batch mixer, Banbury mixer, single or twin screw extruder, ribbon blender, injection molding machine, two roll mill or the like. The components may be kneaded either all at once or dividedly. In the preferred embodiment, the mixing step is conducted for from about 0.1 minutes to about 10 minutes, or more preferably from about 0.3 minutes to about 5 minutes, and most preferably from about 0.5 minutes to about 2 minutes. In the preferred embodiment, the components are pre-compounded, optionally dried to attain a moisture content of about 0.1% or less, and mixed again in a heated extruder. In the preferred embodiment, the heating is conducted at a temperature of from about 100° F. to about 650° F., or more preferably from about 212° F. to about 600° F., and most preferably from about 300° F. to about 575° F. The composition is then extruded through a die and through highly polished chrome rollers into a sheet having a thickness of from about 1/16 inch to about 1 inch, but it can be thicker or thinner as desired. In the preferred embodiment, the extrusion die has a width to produce a sheet 48 inches wide, although this is not critical. Also in the preferred embodiment, the extrudate is cut off so produce sheets having a length of about 96 inches, although this also is not critical.

The thusly produced sheet material is lightweight and preferably has a specific gravity of less than 1.1, more preferably from about 0.88 to about 0.95 and most preferably from about 0.92 to about 0.93. In addition, the surface of the extruded sheet material is very smooth and inherently has a surface roughness (Ra) of from about 7 to about 30, or more preferably from about 7 to about 20 without the need for a further surface pressing operation. Such may be measured with a Surtronic 3 Surface Smoothness Tester.

It preferably has a tensile yield at break of from about 3,300 to about 4,000 psi as measured by ASTM D-638; a modulus of elasticity of from about 225,000 to about 275,000 psi as measured by ASTM D-638; an ultimate elongation of from about 22.5% to about 27.5% as measured by ASTM D-638; an Izod notch impact strength at 73° F. of from about 1.35 to about 1.7 ft.lbs./in$^2$ as measured by ASTM D-256; a Rockwell hardness of from about 95 to about 105 as measured by ASTM D-785; and a heat distortion temperature at 66 psi of from about 240° F. to about 270 ° F.and at 264 psi of from about 125° F. to about 155° F. as measured by ASTM D-648. The material also preferable has a Vicat softening of expansion of about 280° F. to about 310° F. as measured by ASTM D-1545; a linear coefficient of expansion of about $8 \times 10^{-5}$ in./in as measured by ASTM D-696; and an electrical volume resistivity of $>10^{16}$ ohm-cm as measured by ASTM D-257.

A most important characteristic of the thusly produced material is that it passes the following Underwriters Laboratories flame retardancy test UL-94 V-0.

UL-94 V-0 Test

The apparatus employed consists of the following.
A. A test chamber, enclosure or laboratory hood free of induced or forced draft during tests.
B. A Bunsen or Tirrill laboratory burner having a tube with a length of 4.0 inches and an inside diameter of 0.370 (+0.06, −0.0) inch. The tube shall not be equipped with end attachments such as a stabilizer.
C. A ring stand with clamps or the equivalent, adjustable for vertical positioning of specimens.
D. A supply of Technical Grade methane gas with suitable regulator and meter for uniform gas flow. Natural gas having a heat content of approximately 1,000 Btus per cubic foot has been found to provide similar results. Other fuel gases such as butane, propane and acetylene have a higher heat content and are not suitable.

E. A stopwatch or other timing device.
F. A supply of dry absorbent surgical cotton.
G. A desiccator containing anhydrous calcium chloride.
H. A conditioning room or chamber capable of being maintained at 23°±2° C. and a relative humidity of 50±5 percent.
I. A conditioning oven which is a full draft circulating air oven capable of being maintained at 70°±1° C.

Test specimens, 5.0 inches in length by 0.50 inch in width in the minimum and maximum thicknesses are to be tested covering the thickness range to be considered. Specimens tested by this method are limited to a maximum thickness of 0.50 inch. Specimens in intermediate thicknesses are also to be provided and may be tested if the results obtained on the minimum and/or maximum thickness indicate a need. Intermediate thicknesses should not exceed increments of 0,123 inch. The maximum specimen width is to be 0.52 inch and the edges are to be smooth and the radius on the corners is not to exceed 0.05 inch. If the material is to be considered in a range of colors, melt flows, flame retardant additives, or reinforcements, specimens representing those ranges are also to be provided. Specimens in the natural (if used in this color), a light (e.g. white) and a dark (e.g. black) color are to be provided and considered representative of the color range, if the burning characteristics are essentially the same. Specimens in the extremes of the melt flows and reinforcement contents are to be provided and considered representative of the range, if the burning characteristics are essentially the same. If the burning characteristics are not essentially the same for all specimens representing the range, evaluation is to be limited only to the material in the colors, melt flows, flame retardant additives, and reinforcement contents tested, or additional specimens in intermediate colors, melt flows, and reinforcements contents are to be provided for tests.

The specimens are to be conditioned as follows. Sets of five specimens each are to be conditioned for at least 48 hours at a temperature of 23°±2° C. and a relative humidity of 50±5 percent prior to testing. Sets of five specimens each are to be conditioned in a circulating air oven for a duration of 168 hours at 70°±1° C. and then cooled in a desiccator, over anhydrous calcium chloride, for at least 4 hours at room temperature prior to testing.

The Burning Test is to be conducted in a chamber, enclosure or laboratory hood free of induced or forced draft. An enclosed laboratory hood with a heat resistant glass window and an exhaust fan for removing the products of combustion after the test is recommended. Each specimen is to be supported from the upper ¼ inch of the specimen, with the longitudinal axis vertical, by the clamp on the ring stand so that the lower end of the specimen is ⅜ inch above the top of the burner tube and 12 inches above a horizontal layer of dry absorbent surgical cotton. To form the horizontal layer, a small portion, approximately 0.50 by 1.0 inch of cotton is to be pulled from the supply with the thumb and forefinger and then thinned and spread with the fingers into a 20 inch square having a freestanding thickness of 0.25 inch. The burner is then to be placed remote from the specimen, ignited, and adjusted to produce a blue flame ¾ inch high. The flame should be obtained by adjusting the gas supply and the air ports of the burner until a 0.75 inch yellow tipped blue flame is produced and then an increase in the air supply is to be made until the yellow tip disappears. The height of the flame is to be measured again and corrected, if necessary. The test flame is to be placed centrally under the lower end of the test specimen and allowed to remain for 10 seconds. The test flame is then to be withdrawn at least 6 inches away and the duration of the flaming of the specimen noted. When flaming of the specimen ceases, the test flame is to be immediately placed again under the specimen. After 10 seconds, the test flame is again to be withdrawn, and the duration of the flaming and glowing is noted. If the specimen drips flaming or molten material during either flame application, the burner may be tilted to an angle up to 45 degrees and also slightly withdrawn from one of the 0.50 inch sides of the specimens during the flame application, to avoid dripping material into the tube of the burner. If the specimen drips molten or flaming material or is consumed during the test, the burner is to be hand held, and the ⅜ inch distance between the bottom of the specimen and the top of the burner is to be maintained during the flame application. Any molten strings of the material are to be ignored, and the flame is to be applied to the major portion of the specimen. The following are to be observed and recorded:

A. Duration of flaming after first flame application.
B. Duration of flaming after second flame application.
C. Duration of flaming plus glowing after second flame application.
D. Whether or not specimens burn up to the holding clamp.
E. Whether or not specimens drip flaming particles which ignite the cotton swatch.

In order for the materials to pass the UL 94 V-0 test it shall:

A. Not have any specimens which burn with flaming combustion for more than 10 seconds after either application of the test flame.
B. Not have a total flaming combustion time exceeding 50 seconds for the 10 flame applications for each set of five specimens.
C. Not have any specimens which burn with flaming or glowing combustion up to the holding clamp.
D. Not have any specimens which drip flaming particles that ignite the dry absorbent surgical cotton located 12 inches below the test specimen.
E. Not have any specimens with glowing combustion which persists for more than 30 seconds after the removal of the test flame.

If only one specimen from a set of five specimens fails to comply with the requirements, another set of five specimens shall be tested. In the case of the total number of seconds of flaming, an additional set of five specimens shall be tested if the totals are in the range of 51–55 seconds. All specimens from the second set shall comply with the appropriate requirements in order for the material in that thickness to be classified 94 V-0.

The following non-limiting examples serve to illustrate the invention.

EXAMPLE 1

A master batch is prepared by blending the following composition:

| | Parts by Weight |
|---|---|
| Polypropylene pellets (Huntsman 5B82H) | 100.00 |
| PE-68 (Great Lakes Chemical Corporation) | 11.00 |
| antimony oxide (Microfine AO3 from Anzon, Inc.) | 3.00 |
| $TiO_2$ (NL 2073) | 3.00 |
| 164 calcium sulfate (anhydrous) NF (Lenape Chemicals) | 12.00 |
| Doverphos S680 (Dover Chemical Corp.) | 0.15 |

The ingredients are placed in a drum and tumble mixed for 15 minutes. It is then placed in a continuous mixer and heated at a composition temperature of approximately 410° F. The composition is extruded, passed through a four strand die, cooled in a water cooling trough and diced. Thereafter the material is dried. The blend is mixed and heated at a temperature above its melting point in an extruder to form a melt. The material is sequentially passed through a sheet forming die and highly polished rollers to form a sheet 48 inches wide which is cut to a length of 96 inches. The material is found to have the following properties. Density 1.08 g/cm$^2$; water absorption <0.01%; tensile yield at break of 3,600 psi; modulus of elasticity of 250,000 psi; ultimate elongation of 25%; Izod notch impact strength at 73° F. of 1.5 ft.lbs./in$^2$; Rockwell hardness of 98; a heat distortion temperature at 66 psi of from about 250° F. and at 264 psi of from 130° F.; Vicat softening of expansion of about 290° F.; a linear coefficient of expansion of $8 \times 10^{-5}$ in./in; and electrical volume resistivity of $>10^{16}$ ohm-cm. The material conforms to UL 94 V-0 standards.

EXAMPLE 2 (COMPARATIVE)

The procedure of Example 1 is followed using the following formulation.

| | Parts by Weight |
|---|---|
| Polypropylene pellets | 100.00 |
| Potassium Fluoroborate (Englehard Corp. Solon, Ohio) | 31.80 |
| Firebrake ZB (zinc borate from U.S. Borax, N.Y., N.Y.) | 10.50 |
| Declorane Plus ($C_{18}H_{12}Cl_2$ from Occidental Chemical) | 52.60 |
| Antimony oxide | 15.80 |
| Calcium Stearate | 0.30 |

This formulation passes the UL 94 V-0 test standard, however, it has an unacceptably high specific gravity of 1.3279.

EXAMPLE 3 (COMPARATIVE)

The procedure of Example 1 is followed using the following formulation.

| | Parts by Weight |
|---|---|
| Polypropylene pellets | 100.00 |
| Nonnen 52 (Bis-(3,5-dibromo-4-dibromo-propyl-oxyphenyl)sulfone) from Marubishi Oil Chemical Co., Ltd. | 10.00 |
| Antimony oxide | 5.50 |
| Whitex Clay (Aluminum Silicate, Englehard Corp. Edison, New Jersey) | 12.00 |
| Calcium Stearate | 0.30 |
| Cab-O-Sil M5 (Hydrophobic Silicon Dioxide Amorphous from Cabot Corporation, Tuscola, Ill.) | 0.50 |

-continued

| | Parts by Weight |
|---|---|
| $TiO_2$ (NL 2073) | 2.00 |

This material has a lower specific gravity of 1.0596, and passes the UL 94 V-0 test, however, it is not considered to be desirable since it dripped flaming particles during the UL 94 V-0 test.

EXAMPLE 4 (COMPARATIVE)

The procedure of Example 1 is followed using the following formulation.

| | Parts by Weight |
|---|---|
| Polypropylene pellets | 100.00 |
| Nonnen 52 | 10.00 |
| Antimony oxide | 5.00 |
| $TiO_2$ (NL 2073) | 2.00 |
| Calcium Stearate | 0.30 |
| Cab-O-Sil M5 | 0.50 |
| Plastisan B (melamine cyanurate, S-V Chemical Corp. Charlotte, N.C.) | 11.00 |

The thusly formed sheet material is found to fail the UL 94 V-0 test.

EXAMPLE 5 (COMPARATIVE)

The procedure of Example 1 is followed using the following formulation.

| | Parts by Weight |
|---|---|
| Polypropylene pellets | 100.00 |
| Nonnen 52 | 10.00 |
| Antimony oxide | 5.00 |
| $TiO_2$ (NL 2073) | 2.00 |
| Kendrich Drimix K62748 | 0.20 |
| 20% Zirconium IV neoalkanolato, tris(diisooctyl phosphate-O) | |
| 40% tert-butyl peroxide | |
| 40% Supernat 50 silicon dioxide | |
| (available from Kenrich Petrochemicals, Bayonne, N.J.) | |

The thusly formed sheet material is found to fail the UL 94 V-0 test.

EXAMPLE 6 (COMPARATIVE)

The procedure of Example 1 is followed using the following formulation.

| | Parts by Weight |
|---|---|
| Polypropylene pellets | 100.00 |
| Nonnen 52 | 10.00 |
| Antimony oxide | 5.00 |
| Cab-O-Sil M5 | 0.30 |
| $TiO_2$ (NL 2073) | 2.00 |
| Barium Sulfate | 14.00 |
| Calcium Stearate | 0.30 |

The thusly formed sheet material is found to fail the UL 94 V-0 test.

EXAMPLE 7 (COMPARATIVE)

The procedure of Example 1 is followed using the following formulation.

| | Parts by Weight |
|---|---|
| Polypropylene pellets | 100.00 |
| Nonnen 52 | 12.00 |
| Antimony oxide | 6.00 |
| TiO$_2$ (NL 2073) | 2.00 |
| Calcium Sulfate | 12.00 |

This material is unacceptable since eye irritating fumes are emitted during the trial. During extrusion, plate-out and contamination are noticed.

EXAMPLE 8 (COMPARATIVE)

The procedure of Example 1 is followed using the following formulation.

| | Parts by Weight |
|---|---|
| Polypropylene pellets | 100.00 |
| Nonnen 52 | 13.00 |
| Antimony oxide | 6.50 |
| TiO$_2$ (NL 2073) | 2.00 |

This material is unacceptable since eye irritating fumes are emitted during the trial. During extrusion, plate-out and contamination are noticed.

EXAMPLE 9 (COMPARATIVE)

The procedure of Example 1 is followed using the following formulation.

| | Parts by Weight |
|---|---|
| Polypropylene pellets | 100.00 |
| Nonnen 52 | 12.00 |
| Antimony oxide | 6.00 |
| TiO$_2$ (NL 2073) | 2.00 |
| Calcium Sulfate | 12.00 |
| Mark 2100 (organotin carboxylate, Argus Chemical Div. of Witco Corp., Brooklyn, N.Y.) | 0.40 |

The thusly formed sheet material is found to pass the UL 94 V-0 test, but demonstrates poor heat stability during processing.

EXAMPLE 10 (COMPARATIVE)

The procedure of Example 1 is followed using the following formulation.

| | Parts by Weight |
|---|---|
| Polypropylene pellets | 100.00 |
| Nonnen 52 | 12.00 |
| Antimony oxide | 6.00 |
| TiO$_2$ (NL 2073) | 2.00 |
| Calcium Sulfate | 12.00 |
| Lenastabe MT (dibutyltin maleate, Lenape Chemical, Bound Brook, N.J.) | 0.40 |

The thusly formed sheet material demonstrates poor heat stability during processing.

EXAMPLE 11 (COMPARATIVE)

The procedure of Example 1 is followed using the following formulation.

| | Parts by Weight |
|---|---|
| Polypropylene pellets | 100.00 |
| Antimony oxide | 3.00 |
| TiO$_2$ (NL 2073) | 3.00 |
| Calcium Sulfate | 12.00 |
| Doverphos S-680 | 0.15 |
| Saytex 102 (Decabromodiphenyl oxide, from Ethyl Corporation Chemical Group) | 22.00 |

The thusly produced material does not pass the UL 94 V-0 test.

EXAMPLE 12 (COMPARATIVE)

The procedure of Example 1 is followed using the following formulation.

| | Parts by Weight |
|---|---|
| Polypropylene pellets | 100.00 |
| Antimony oxide | 10.00 |
| TiO$_2$ (NL 2073) | 3.00 |
| Calcium Sulfate | 12.00 |
| Doverphos S-680 | 0.15 |
| Saytex BT93 (ethylene-bis-tetrabromophthalimide from Ethyl Corporation) | 38.00 |

The thusly produced material does not pass the UL 94 V-0 test.

EXAMPLE 13 (COMPARATIVE)

The procedure of Example 1 is followed using the following formulation.

| | Parts by Weight |
|---|---|
| Polypropylene pellets | 100.00 |
| Antimony oxide | 6.00 |
| TiO$_2$ (NL 2073) | 3.00 |
| Calcium Sulfate | 12.00 |
| Doverphos S-680 | 0.15 |
| Saytex N451 (Ethylene-bis-5,6-dibromonorbane-2,3-dicarboximide from Ethyl Corporation) | 38.00 |

The thusly produced material does not pass the UL 94 V-0 test.

EXAMPLE 14

The procedure of Example 1 is followed using the following formulations in parts by weight:

| | I | II | III | IV | V |
|---|---|---|---|---|---|
| Polypropylene pellets | 100.00 | 100.00 | 100.00 | 100.00 | 100.00 |
| Antimony oxide | 3.00 | 3.00 | 3.00 | 6.00 | 6.00 |
| TiO$_2$ (NL 2073) | 3.00 | 3.00 | 3.00 | 3.00 | 3.00 |
| Calcium Sulfate | — | 12.00 | 12.00 | — | 12.00 |
| Doverphos S-680 | — | — | 0.15 | — | 0.15 |
| PE-68 | 11.00 | 11.00 | 11.00 | 11.00 | 11.00 |

The following results are noted.

Formulations I and IV produce materials which are not satisfactorily homogeneous, show an inconsistent flow rate and poor heat stability. Formulation II shows poor heat stability. Formulations III and V, according to the invention, produce satisfactory materials which pass the UL 94 V-0 test.

What is claimed is:

1. A substantially uniformly blended, flame retardant polypropylene composition which comprises:
   a) a polypropylene polymer in an amount sufficient to form a substantially uniform composition when blended with the other composition components; and b) from about 8% to about 16% by weight of the polypropylene of the bis(2,3 dibromopropylether) of tetrabromobisphenol A); and
c) from about 1.5% to about 6.5% by weight of the polypropylene of antimony trioxide; and
d) from about 2% to about 7% by weight of the polypropylene of titanium dioxide; and
e) from about 7% to about 17% by weight of the polypropylene of calcium sulfate; and
f) from 0.05% to about 0.40% by weight of the polypropylene of distearyl pentaerythritol diphosphite.

2. The composition of claim 1 wherein compound (b) is present in an amount of from about 10% to about 12% based on the weight of the polypropylene in the overall composition.

3. The composition of claim 1 wherein compound (c) is present in an amount of from about 2% to about 5% based on the weight of the polypropylene in the overall composition.

4. The composition of claim 1 wherein compound (d) is present in an amount of from about 2% to about 5% based on the weight of the polypropylene in the overall composition.

5. The composition of claim 1 wherein compound (e) is present in an amount of from about 10% to about 14% based on the weight of the polypropylene in the overall composition.

6. The composition of claim 1 wherein compound (f) is present in an amount of from about 0.10% to about 0.25% based on the weight of the polypropylene in the overall composition.

7. The composition of claim 1 wherein compound (b) is present in an amount of from about 10% to about 12%; and wherein compound (c) is present in an amount of from about 2% to about 5%; and wherein compound (d) is present in an amount of from about 2% to about 5%; and wherein compound (e) is present in an amount of from about 10% to about 14%; and wherein compound (f) is present in an amount of from about 0.10% to about 0.25%, all based on the weight of the polypropylene in the overall composition.

8. The composition of claim 1 wherein the polypropylene component is a polypropylene homopolymer having a melting point in the range of from about 325 to about 335; a specific gravity in the range of from about 0.88 to about 0.95 and a melt flow rate in the range of from about 0.2 to about 30 g/10 min.

9. The composition of claim 1 wherein the non-polypropylene components have a mean particle size of up to about 20 microns.

10. A method of forming a flame retardant polypropylene sheet material which comprises:
i.) forming a substantially uniform physical blend comprising
   a) a polypropylene polymer in an amount sufficient to form a substantially uniform composition when blended with the other composition components; and
   b) from about 8% to about 16% by weight of the polypropylene of the bis(2,3 dibromopropylether) of tetrabromobisphenol A); and
   c) from about 1.5% to about 6.5% by weight of the polypropylene of antimony trioxide; and
   d) from about 2% to about 7% by weight of the polypropylene of titanium dioxide; and
   e) from about 7% to about 17% by weight of the polypropylene of calcium sulfate; and
   f) from 0.05% to about 0.40% by weight of the polypropylene of distearyl pentaerythritol diphosphite; and
ii.) optionally drying the blend; and
iii.) heating the blend at a temperature above its melting point to thereby form a melt of the blend components while mixing the melt; and
iv.) extruding the blend through a sheet forming die and highly polished rollers.

11. The method of claim 10 wherein the heating is conducted at a temperature of from about 100° F. to about 650° F.

12. The flame retardant polypropylene sheet produced by the method of claim 10.

13. The flame retardant polypropylene sheet of claim 12 which has a specific gravity of about 1.0 or less.

14. The sheet of claim 13 wherein compound (b) is present in an amount of from about 10% to about 12% based on the weight of the polypropylene in the overall composition.

15. The sheet of claim 13 wherein compound (c) is present in an amount of from about 2% to about 5% based on the weight of the polypropylene in the overall composition.

16. The sheet of claim 13 wherein compound (d) is present in an amount of from about 2% to about 5% based on the weight of the polypropylene in the overall composition.

17. The sheet of claim 13 wherein compound (e) is present in an amount of from about 10% to about 14% based on the weight of the polypropylene in the overall composition.

18. The sheet of claim 13 wherein compound (f) is present in an amount of from about 0.10% to about 0.25% based on the weight of the polypropylene in the overall composition.

19. The sheet of claim 13 wherein compound (b) is present in an amount of from about 10% to about 12%; and wherein compound (c) is present in an amount of from about 2% to about 5%; and wherein compound (d) is present in an amount of from about 2% to about 5%; and wherein compound (e) is present in an amount of from about 10% to about 14%; and wherein compound (f) is present in an amount of from about 0.10% to about 0.25%, all based on the weight of the polypropylene in the overall composition.

20. The sheet of claim 13 wherein the polypropylene component is a polypropylene homopolymer having a melting point in the range of from about 325 to about 335; a specific gravity in the range of from about 0.88 to about 0.95 and a melt flow rate in the range of from about 0.2 to about 30 g/10 min.

21. The sheet of claim 13 wherein the non-polypropylene components have a mean particle size of up to about 20 microns.

22. The sheet of claim 13 having a tensile yield at break of from about 3,300 to about 4,000 psi; a modulus of elasticity of from about 225,000 to about 275,000 psi; an ultimate elongation of from about 22.5% to about 27.5%; an Izod notch impact strength at 75° F. of from about 1.35 to about 1.7 ft.lbs./in$^2$; a Rockwell hardness of from about 95 to about 105; a heat distortion temperature at 66 psi of from about 240° F. to about 270 ° F.; a heat distortion temperature at 264 psi of from about 125° F. to about 155° F.; a Vicat softening of expansion of about 280° F. to about 310° F.; a linear coefficient of expansion of about $8 \times 10^{-5}$ in./in; and an electrical volume resistivity of $>10^{16}$ ohm-cm.

* * * * *